(12) United States Patent
Job

(10) Patent No.: US 7,166,553 B2
(45) Date of Patent: Jan. 23, 2007

(54) MIXED CATALYST COMPOSITIONS FOR THE PRODUCTION OF POLYOLEFINS

(75) Inventor: Robert C. Job, Katy, TX (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 20 days.

(21) Appl. No.: 10/508,852

(22) PCT Filed: Apr. 29, 2003

(86) PCT No.: PCT/US03/13311

§ 371 (c)(1),
(2), (4) Date: Sep. 24, 2004

(87) PCT Pub. No.: WO03/095508

PCT Pub. Date: Nov. 20, 2003

(65) Prior Publication Data

US 2005/0170950 A1    Aug. 4, 2005

Related U.S. Application Data

(60) Provisional application No. 60/378,244, filed on May 6, 2002.

(51) Int. Cl.
*C08F 4/649* (2006.01)
(52) U.S. Cl. .................... 502/123; 526/124.9
(58) Field of Classification Search ............... 502/118, 502/103, 123; 526/351, 124.3, 124.9
See application file for complete search history.

(56) References Cited

U.S. PATENT DOCUMENTS

| | | | |
|---|---|---|---|
| 4,659,685 A | 4/1987 | Coleman, III et al. ...... | 502/113 |
| 5,118,649 A * | 6/1992 | Job ............................. | 502/124 |
| 5,134,209 A * | 7/1992 | Job et al. .................... | 526/141 |
| 5,164,352 A * | 11/1992 | Job et al. .................... | 502/124 |
| 5,183,867 A | 2/1993 | Welborn, Jr. ................ | 526/114 |
| 5,229,477 A * | 7/1993 | Job et al. .................... | 526/141 |
| 5,266,544 A | 11/1993 | Tsutsui et al. .............. | 502/113 |
| 5,270,276 A * | 12/1993 | Job ............................. | 502/123 |
| 5,270,410 A * | 12/1993 | Job ............................ | 526/124.9 |
| 5,294,581 A * | 3/1994 | Job ............................. | 502/124 |
| 5,387,567 A | 2/1995 | Tajima et al. ............... | 502/103 |
| 5,395,810 A | 3/1995 | Shamshoum et al. ....... | 502/113 |
| 5,527,752 A | 6/1996 | Reichle et al. ............. | 502/117 |
| 5,539,076 A | 7/1996 | Nowlin et al. ........... | 526/348.1 |
| 5,747,405 A | 5/1998 | Little et al. ................. | 502/113 |
| 6,103,657 A * | 8/2000 | Murray ....................... | 502/155 |
| 6,228,792 B1 * | 5/2001 | Carney ....................... | 502/123 |
| 6,320,005 B1 * | 11/2001 | Murray ....................... | 526/161 |
| 6,436,864 B1 * | 8/2002 | Tagge ......................... | 502/123 |
| 6,831,187 B1 * | 12/2004 | Murray ....................... | 556/51 |

FOREIGN PATENT DOCUMENTS

| | | |
|---|---|---|
| EP | 0 676 418 | 3/1995 |
| EP | 0 717 755 | 7/1995 |
| EP | 0 705 848 | 9/1995 |
| EP | 0 747 402 | 6/1996 |
| WO | 95/13871 | 5/1995 |
| WO | 96/13532 | 5/1996 |
| WO | 98/02245 | 1/1998 |
| WO | WO 01/25297 A1 * | 4/2001 |
| WO | 01/48036 | 7/2001 |
| WO | 01/48037 | 7/2001 |
| WO | 01/48038 | 7/2001 |

* cited by examiner

*Primary Examiner*—David M. Brunsman

(57) ABSTRACT

A solid, hydrocarbon insoluble catalyst composition comprising: A) a solid, particulated complex comprising moieties of at least magnesium, a Group 4 transition metal, and a halide; B) one or more α-amino-substituted- or α-imino-substituted-2-alkylpyridine compounds; C) one or more organoaluminum cocatalyst compounds; D) optionally one or more internal electron donors; and E) optionally one or more selectivity control agents, a method of preparation and a method of use in polymerizing olefins is disclosed.

8 Claims, 1 Drawing Sheet

MIXED CATALYST COMPOSITIONS FOR THE PRODUCTION OF POLYOLEFINS

CROSS REFERENCE STATEMENT

This application is a 371 of PCT/US03/13311, filed 29 Apr. 2003. This application claims the benefit of U.S. Provisional Application No. 60/378,244, filed May 6, 2002.

BACKGROUND OF THE INVENTION

The present invention relates to solid, hydrocarbon insoluble, mixed catalyst compositions useful in the heterogeneously catalyzed polymerization of olefins to high molecular weight olefin homopolymers and copolymers, especially polyethylene, polypropylene, and ethylene/propylene copolymers.

It is previously known to prepare solid catalyst compositions comprising a conventional Ziegler-Natta supported transition metal composition and a homogeneous catalyst composition such as a metallocene. Examples include U.S. Pat. Nos. 5,747,405, 5,539,076, 5,395,810, 5,266,544, 5,183,867, 4,659,685, EP-A's 676,418, 717,755, 705,848, 747,402, and WO's 98/02245, 96/13532, and 95/13871. Suitable supports included silica, alumina, and magnesium-dichloride.

Coordination complexes of Group 4 metals and unsaturated compounds such as cyclopentadiene or heteroallyl compounds are described in U.S. Pat. No. 5,527,752. In addition, U.S. Pat. No. 5,387,567 discloses a method of treating soluble zirconium complexes with cyclopentadiene to produce a homogeneous catalyst component for use in solution polymerizations. Solid, hydrocarbon insoluble catalyst compositions comprising the reaction product of a cyclopentadiene and a magnesium alkoxide based Ziegler/Natta composition are disclosed in WO01/48036, WO01/48037 and WO01/48038.

SUMMARY OF THE INVENTION

Figure 1:
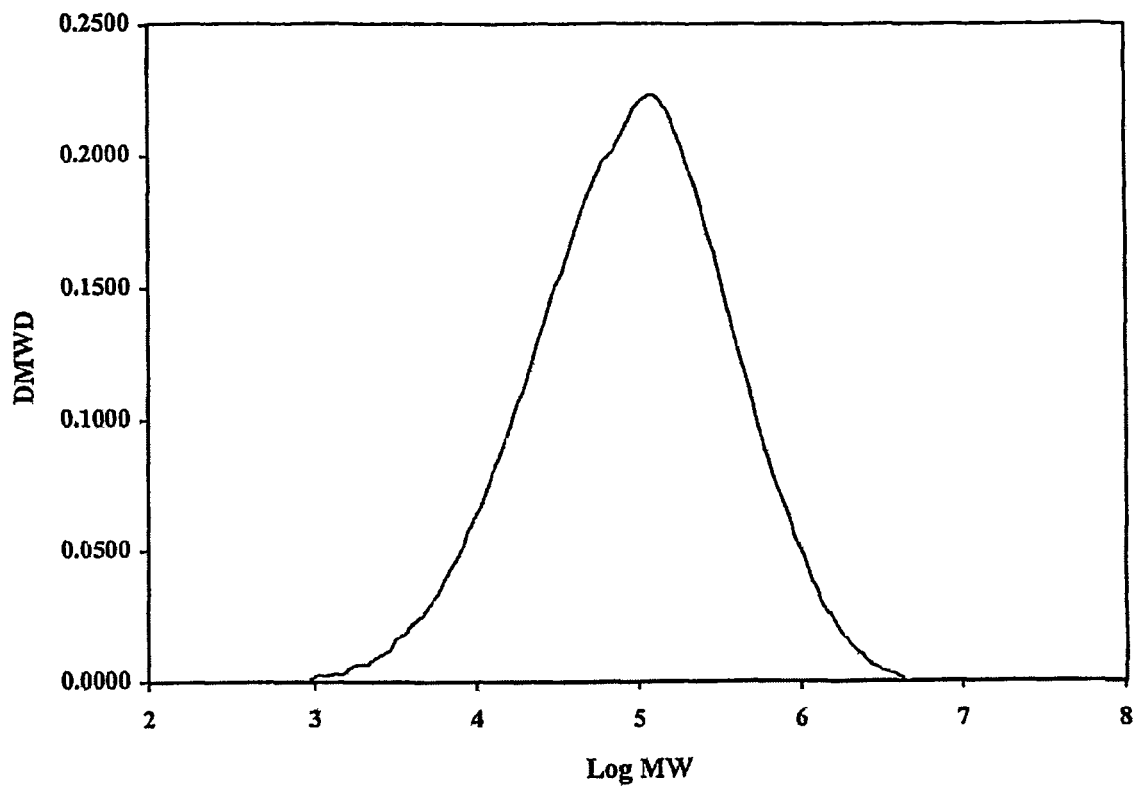
FIG. 1 is the size exclusion chromatograph (SEC) of the polymer obtained from polymerization example 1.

According to the present invention there is provided a solid, hydrocarbon insoluble catalyst composition comprising:

A) a solid, particulated complex comprising moieties of at least magnesium, a Group 4 transition metal, and a halide (referred to as a magnesium and Group 4 metal-containing halide complex);

B) one or more α-amino-substituted- or α-imino-substituted-2-alkylpyridine compounds;

C) one or more organoaluminum cocatalyst compounds;

D) optionally one or more internal electron donors; and

E) optionally one or more selectivity control agents.

The invention also relates to methods of making the solid, hydrocarbon insoluble, catalyst composition, and to a polymerization process using the same to make polyolefins.

DETAILED DESCRIPTION

All reference to the Periodic Table of the Elements herein shall refer to the Periodic Table of the Elements, published and copyrighted by CRC Press, Inc., 1999. Also, any reference to a Group or Groups shall be to the Group or Groups as reflected in this Periodic Table of the Elements using the IUPAC system for numbering groups. For purposes of United States patent practices the contents of any patent, patent application or publication referenced herein are hereby incorporated by reference in their entirety herein, especially with respect to the disclosure of structures, synthetic techniques and general knowledge in the art. The term "comprising" when used herein with respect to a composition or mixture is not intended to exclude the additional presence of any other compound or component. The term "aromatic" or "aryl" refers to a polyatomic, cyclic, ring system containing $(4\delta+2)$ π-electrons, wherein δ is an integer greater than or equal to 1.

The solid, particulated, magnesium and Group 4 metal-containing halide complex component of the present catalyst composition preferably comprises titanium, zirconium, a mixture of titanium and zirconium, a mixture of titanium and hafnium, a mixture of zirconium and hafnium, or a mixture of titanium, zirconium and hafnium moieties. In the foregoing mixtures, especially the mixtures comprising zirconium and hafnium, it is understood that the quantity of metal moieties present in the mixture is greater than would be expected to be present due to impurities normally occurring in purified compounds of a single Group 4 metal.

Most preferably, the solid, particulated magnesium and Group 4 metal-containing halide complex component is a solid magnesium and zirconium-containing complex or a solid magnesium and hafnium-containing complex. In addition to halide moieties, the complex additionally preferably comprises one or more alkoxide and/or aryloxide moieties, especially such moieties selected from the group consisting of ethoxide, n-butoxide and o-cresolate moieties.

When preparing the catalyst composition of the invention, the solid magnesium and Group 4 metal-containing halide complex preferably is prepared by conventional coprecipitation/methasis, or physical comminuting techniques previously known in the art for preparing Ziegler-Natta procatalysts comprising a Group 4 metal halide supported on crystalites of magnesium dihalide. Preferably the solid magnesium and Group 4 metal-containing halide complex is prepared by halogenating a solid, particulated precursor containing magnesium and Group 4 metal moieties, alkoxide and/or aryloxide moieties, halide moieties, and optionally an internal donor compound, with a halogenating agent, especially $TiCl_4$, $VCl_4$, mixtures thereof, and/or mixtures of either or both compounds with $SiCl_4$ to prepare a solid, particulated, magnesium and Group 4 metal-containing halide complex. Preferred solid, particulated, magnesium and Group 4 metal-containing halide complexes are those wherein the halide moieties are chloride moieties.

Any solid, magnesium and Group 4 metal-containing complex (interchangeably referred to herein as a precursor) can be used in the present invention, and any means known to halogenate such a precursor can be used to prepare the solid, magnesium and Group 4 metal-containing halide complex (interchangeably referred to herein as the procatalyst) when preparing the catalyst compositions of the invention. Suitable techniques are disclosed in U.S. Pat. Nos. 5,034,361; 5,082,907; 5,151,399; 5,229,342; 5,106,806; 5,146,028; 5,066,737; 5,124,298, and 5,077,357, and elsewhere.

When magnesium dialkoxides or diaryloxides, such as magnesium diethoxide or magnesium di(o-cresolate) are used as the starting materials to form the precursor according to the precipitation technique, the magnesium compound and a Group 4 metal alkoxide or a Group 4 metal alkoxide halide are combined in an inert diluent along with a small quantity of a Group 4 metal halide, especially $TiCl_4$ or $ZrCl_4$. Suitable diluents include aromatic hydrocarbons or halohydrocarbons, or mixtures thereof with one or more alcohols. A small quantity of one or more solubilizing agents, (referred to as a "clipping agent") may be employed as needed to assist in solubilizing one or more of the metal compounds. Examples of such clipping agents include o-cresol, p-cresol, mixtures of o-cresol and p-cresol, 3-methoxyphenol, 4-dimethylaminophenol, 2,6-di-tert-butyl-4-methylphenol, p-chlorophenol, methylsalicylate, HCHO, $CO_2$, $B(OEt)_3$, $SO_2$, $Al(OEt)_3$, $Si(OR)_4$, $R'Si(OR)_3$, and $P(OR)_3$., as well as sources of the following anions, $CO_3^=$, $Br^-$; $(O_2COEt)^-$. In the above compounds, R and R' represent hydrocarbon groups, preferably alkyl groups, containing from 1–10 carbon atoms, and preferably R and R' are the same or different and are methyl or ethyl. Suitable sources for the foregoing anionic clipping agents include $MgBr_2$, carbonized magnesium ethoxide (magnesium ethyl carbonate), and calcium carbonate. The use of clipping agents in the preparation of a solid, particulated, magnesium and Group 4 metal containing precursor complex is disclosed in U.S. Pat. Nos. 5,124,298 and 5,077,357, and elsewhere.

Preferred diluents for the foregoing precipitation process are halogenated hydrocarbons, especially chlorobenzene or chlorotoluene. The metal compounds, optional clipping agent(s), and diluent are combined with heating in a digest step. Preferred temperatures are from 25 to 120° C., more preferably from 30 to 90° C. A small quantity of a precipitating agent, preferably an aliphatic alcohol, especially ethanol or n-butanol is employed to initially assist in solubilizing the resulting metal complex. Upon removal of the alcohol from the mixture in a controlled manner, a uniformly shaped, solid, particulated magnesium and Group 4 metal containing precursor complex is obtained. The precursor may be rinsed one or more times, desirably with an aliphatic hydrocarbon, and ultimately devolatilized to remove volatile contaminants if desired.

Highly desired magnesium and Group 4 metal containing precursor complexes are controlled morphology granular solid materials having the approximate formula $Mg_3M(OR'')_8Cl_2$ whereby M is a Group 4 metal moiety, and R" is $C_{1-4}$ alkyl, especially ethyl.

Next the magnesium and Group 4 metal containing precursor complex is halogenated in one or more methasis step to cause formation of the magnesium and Group 4 metal containing precursor halide complex in the form of high surface area, magnesium chloride crystalites in combination with one or more Group 4 metal halide compounds. Techniques for such process are well known and disclosed for example in U.S. Pat. Nos. 5,034,361; 5,082,907; 5,151,399; 5,229,342; 5,106,806; 5,146,028; 5,066,737; 5,077,357; 4,442,276; 4,540,679; 4,547,476; 4,460,701; 4,816,433; 4,829,037; 4,927,797; 4,990,479; 5,066,738; 5,028,671; 5,153,158; 5,247,031; 5,247,032, and elsewhere.

One suitable method for converting the precursor into a solid, particulated magnesium and Group 4 metal halide complex for use herein is by reacting the precursor with a tetravalent titanium halide, an optional hydrocarbon or halohydrocarbon, and an electron donor. The tetravalent titanium halide is suitably an aryloxy- or alkoxy- di- or trihalide such as diethoxytitanium dichloride, dihexyloxytitanium dibromide or diisopropoxytitaniumdichloride or the tetravalent titanium halide is a titanium tetrahalide, such as titanium tetrachloride or titanium tetrabromide. Particularly preferred is titanium tetrachloride.

The optional hydrocarbon or halohydrocarbon employed preferably contains up to 12 carbon atoms inclusive, more preferably up to 9 carbon atoms inclusive. Exemplary hydrocarbons include pentane, octane, benzene, toluene, xylene, and alkylbenzenes. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. Of the aliphatic halohydrocarbons, compounds containing at least two chloride substituents are preferred, with carbon tetrachloride and 1,1,2-trichloroethane being most preferred. Of the aromatic halohydrocarbons, chlorobenzene or chlorotoluene is particularly preferred.

Suitable electron donors are Lewis base compounds that are free from active hydrogens that are conventionally employed in the formation of titanium-based procatalysts. Particularly preferred electron donors include ethers, esters, amines, imines, nitriles, phosphines, stibines, and arsines. The more preferred electron donors, however are aliphatic and aromatic carboxylic acid (poly)esters or (poly)ether derivatives thereof, particularly alkyl esters of aromatic monocarboxylic or dicarboxylic acids and ether derivatives thereof. Examples of such electron donors are methylbenzoate, ethylbenzoate, ethyl-p-ethoxybenzoate, ethyl-p-methylbenzoate, diethylphthalate, dimethylnaphthalenedicarboxylate, diisobutylphthalate, diisopropyl terephthalate, and mixtures thereof. Most preferred electron donors are ethylbenzoate, p-ethoxyethylbenzoate, and diisobutylphthalate.

The manner in which the precursor complex, the optional hydrocarbon or halohydrocarbon, optional electron donor and halogenating agent are contacted is not critical. In one embodiment, the halogenating agent is added to a mixture of the electron donor and precursor. More preferably, however, the electron donor first is mixed with the tetravalent titanium halide and optional halohydrocarbon and the resulting mixture is used to contact the precursor complex in one or more contactings at elevated temperatures from 70 to 120° C., preferably from 80 to 115° C.

The solid product that results may be contacted with a further quantity of titanium halide compound, if desired, and in addition a halohydrocarbon. The two procedures may be combined or employed separately. Moreover, it often is useful to also include an acid chloride, such as benzoyl chloride or phthaloyl chloride, separately or in combination with the foregoing post treatments, to further facilitate the replacement of alkoxide moieties with halide moieties in the solid, particulated, magnesium and Group 4 metal halide complex. The resulting product may then be washed one or more times with an aliphatic hydrocarbon or hydrocarbon mixture such as isooctane to remove soluble Group 4 metal species.

In a preferred embodiment, the mixture of precursor, halogenating agent, optional electron donor and optional halohydrocarbon is maintained at an elevated temperature, for example, a temperature of up to 150° C., for a period of time, during one or more of the foregoing metathesis steps. Best results are obtained if the materials are contacted initially at or ambient temperature and then heated. Sufficient tetravalent titanium halide is provided to convert at least a portion and preferably at least a substantial portion of the alkoxide moieties of the procatalyst precursor to halide groups. This replacement is conducted in one or more contacting operations, each of which is conducted over a period of time ranging from a few minutes to a few hours and it is preferred to have a halohydrocarbon present during each contacting. Sufficient electron donor preferably is provided so that the molar ratio of electron donor to the magnesium present in the solid, particulated, magnesium and Group 4 metal halide complex is from 0.01:1 to 1:1, preferably from 0.05:1 to 0.5:1.

After formation of the solid, particulated, magnesium and Group 4 metal halide complex, it is separated from the reaction medium, preferably by filtering to produce a moist filter cake. The moist filter cake desirably is then rinsed to remove unreacted halogenating agent and may be dried to remove residual liquid, if desired. In a preferred embodiment, the moist, rinsed filter cake is then extracted one or more times, as previously disclosed, to reduce the Group 4 metal content to a stable level.

The extraction involves contacting the moist mass comprising the solid, particulated, magnesium and Group 4 metal halide complex, preferably a filter cake, with a liquid diluent and increasing the temperature of the mixture to above room temperature, and separating the resulting solid. It is particularly preferred to contact the mixture at a temperature greater than 45° C., preferably greater than 85° C., more preferably greater than 115° C., and most preferably greater than 120° C. to 300° C., more preferably to 200° C., and most preferably to 150° C.

The solid, particulated magnesium and Group 4 metal halide complex preferably employed in the present invention suitably has a Group 4 metal content of from 0.15 percent by weight to 15 percent by weight, preferably from 0.6 percent by weight to 12 percent by weight, and most preferably from 0.75 percent by weight to 7 percent by weight. The molar ratio of Group 4 metal to magnesium is suitably between 1:1.5 and 1:100, preferably between 1:2 and 1:40, and most preferably between 1:3 and 1:30.

A preferred solid, particulated magnesium and Group 4 metal halide complex for use herein corresponds to the formula $Mg_dTi(OR^e)_eX_f(ED)_g$ wherein $R^e$, independently each occurrence is an aliphatic or aromatic hydrocarbon radical having 1 to 14 carbon atoms or $COR^f$ wherein $R^f$ is an aliphatic or aromatic hydrocarbon radical having 1 to 14 carbon atoms; X independently each occurrence is chlorine, bromine or iodine; ED is an electron donor; d is a number from 1 to 50; e is a number from 0 to 5; f is a number from 2 to 100; and g is a number from 0 to 10.

The foregoing solid, particulated magnesium and Group 4 metal halide complex and optional internal electron donor, is combined with one or more α-amino-substituted- or α-imino-substituted-2-alkylpyridine compounds, one or more aluminum containing, cocatalyst compounds, and optional selectivity control agent to form the catalyst composition of the invention. Preferred substituted 2-alkylpyridine compounds correspond to the following formulas I or II:

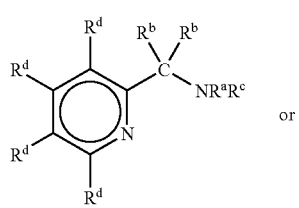

(I)

or

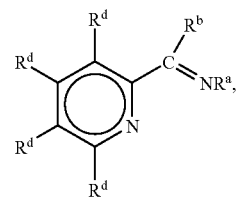

(II)

wherein:

$R^a$ is aryl, or an aryl group substituted with one or more alkyl, halo, haloalkyl, or dihydrocarbylamine groups, said $R^a$ group having from 6 to 30 carbons;

$R^b$ and $R^d$, independently each occurrence, are selected from the group consisting of hydrogen, $R^a$, $C_{1-10}$ alkyl, $C_{1-10}$ haloalkyl, and $C_{7-20}$ aralkyl; and $R^c$ is hydride, an alkali metal cation, an alkaline earth metal halide cation, or a cationic organometal ligand comprising a metal of Groups 2–13 of the Periodic Table of the Elements.

Preferred substituted 2-alkylpyridine compounds for use according to the present invention are those of the foregoing formulas I or II wherein $R^a$ is a 2,6-dialkyl substituted phenyl group, preferably 2,6-di(1-methylethyl)phenyl, $R^b$ independently each occurrence is $C_{1-4}$ alkyl, preferably methyl, $R^c$ is hydrogen, and $R^d$ is hydrogen. Highly preferred 2-alkylpyridine compounds for use in the present invention are 2-pyridyl-2-(N-(2,6-diisopropylphenyl)amino)propane and (6(1-naphthyl)pyrid-2-yl)(N-(2,6-diisopropylphenyl)amino)(2-methylphenyl)methane.

Desirably, the molar ratio of substituted 2-alkylpyridine compound based on the amount of Group 4 metal employed in the present catalyst compositions varies from 10:1 to 0.1:1, preferably from 2:1 to 0.5:1, and most preferably from 1.5:1 to 0.8:1.

Suitable organoaluminum cocatalyst compounds include $tri(C_{1-4})$alkyl-aluminum compounds, di $(C_{1-4})$alkylaluminum halide compounds, and oxygen containing organoaluminum compounds. Preferred organoaluminum cocatalysts are oligomeric or polymeric alumoxanes or such alumoxanes modified by incorporation of one or more different trialkyl aluminum compounds, especially methalumoxane or tri(isobutyl)aluminum modified methalumoxane.

The amount of organoaluminum compound employed in the catalyst composition can be varied over a wide range. Generally, the quantity of organoaluminum compound employed is dictated by economics with sufficient being used to obtain adequate catalyst performance while avoiding an excess. By adjusting quantity of cocatalyst to the amount of Group 4 metal contained in the catalyst, the molecular weight distribution of the resulting polyolefin may be altered. For example, to broaden the molecular weight distribution of the resulting polyolefin, the quantity of organoaluminum compound generally is increased.

In addition to causing the catalyst composition to become catalytically active, the organoaluminum compound is also employed in the present invention to assist in reaction of the substituted 2-alkylpyridine compound with the solid, particulated magnesium Group 4 metal halide complex. Overall, useful molar ratios of organoaluminum compound based on the amount of Group 4 metal are from 2:1 to 100,000:1, preferably from 10:1 to 10,000:1, and most preferably from 50:1 to 500:1.

The catalyst composition of the invention may additionally include a selectivity control agent (SCA). Such compounds are well known to the skilled artisan and are used to control the stereoselectivity of tactic polymers, such as polypropylene, prepared using the catalyst. Suitable SCAs include the previously mentioned Lewis bases employed as internal electron donors, as well as silane compounds containing one or more alkoxy groups, particularly methylcyclohexyldimethoxysilane (MCHDMS), diphenyldimethoxysilane (DPDMS), dicyclopentyldimethoxysilane (DCPDMS), isobutyltrimethoxysilane (IBTMS), and n-propyltrimethoxysilane (NPTMS). Suitable silane selectivity control agents are disclosed in U.S. Pat. Nos. 4,990,479, 5,438,110, 4,218,339; 4,395,360; 4,328,122; 4,473,660; 4,562,173, 4,547,552, and elsewhere.

One beneficial advantage of the present catalyst compositions is that by careful selection of the α-amino-substituted- or α-imino-substituted-2-alkylpyridine compound employed in the composition, little or no internal electron donor and/or selectivity control agent needs to be employed in the catalyst composition in order to enhance stereoselectivity in tactic polymer production. In particular, it has been discovered that the presence of bulky ligand groups at one or more positions of the substituted 2-alkylpyridine compound, especially polycyclic, aromatic groups such as 1-naphthyl on the pyridine ring, especially at the 6-position and 2,6-dialkylaryl- substituted amino- or imino- substituents, such as 2,6-diisopropylphenyl-substituted amino- or imino-substituents, at the 1-position of the alkyl group, give greater stereoselectivity in the resulting tactic polymer. In a highly desirable embodiment of the present invention, it has been discovered that propylene may be homopolymerized or copolymerized with one or more olefins or diolefins using a catalyst as previously disclosed which comprises (6-(1-naphthyl)pyrid-2-yl)(N-(2,6-diisopropylphenyl)-amino)(2-methylphenyl)methane.

The catalyst composition of the invention is suitably prepared by combining the solid, particulated magnesium and Group 4 metal halide complex, preferably a complex prepared from a mixture of magnesium dialkoxide or di(aryloxide) compounds and Group 4 metal alkoxides and containing an internal electron donor, with the substituted 2-alkylpyridine compound and organoaluminum cocatalyst compound in the presence of a liquid diluent, and optionally, a selectivity control agent. The ratio of the various components can vary within wide limits, and is determined by the desired product properties of the polyolefin resins to be prepared. In general, if a bimodal polyolefin having a greater amount of a low molecular weight component having a narrow molecular weight distribution (Mw/Mn, referred to as MWD) is desired, the ratio of 2-alkyl substituted pyridine compound to solid, particulated magnesium and Group 4 metal halide complex should be increased. Contrariwise, if a greater amount of a higher molecular weight component having a broader MWD is desired, then the proportion of solid, particulated magnesium and Group 4 metal halide complex should be increased.

Any diluent can be used in preparing the foregoing catalyst composition so long as it is non-reactive with the respective components. Examples include liquid, hydrocarbons, especially aliphatic hydrocarbons such as butane, isobutane, ethane, propane, pentane, isopentane, hexane, heptane, octane, decane, dodecane, hexadecane, octadecane, and mixtures thereof; alicyclic hydrocarbons such as cyclopentane, methylcyclopentane, cyclohexane, cyclooctane, norbornane, ethylcyclohexane and mixtures thereof; aromatic hydrocarbons such as benzene, toluene, ethylbenzene, propylbenzene, butylbenzene, xylene, tetrahydrofuran and mixtures thereof; petroleum fractions such as gasoline, kerosene, and mineral oil; halogenated hydrocarbons such as methylene chloride, chlorobenzene, chlorotoluene and mixtures thereof; and mixtures of any or all of the foregoing.

It is preferred in the present invention to prepare the catalyst composition by first suspending or slurrying the solid, particulated magnesium and Group 4 metal halide complex component in a suitable diluent. The substituted 2-alkylpyridine compound then can be added to the slurry, along with, preceding or following the addition of the organic aluminum compound and/or selectivity control agent. The resulting mixture is then stirred for a period of time sufficient to allow intimate contact between the respective components, preferably from 10 hours to 72 hours, more preferably from 10 hours to 35 hours, and most preferably for 10 to 24 hours. After the foregoing contacting procedure the resulting catalyst composition is recovered by any suitable technique.

Examples of suitable recovery techniques include filtration, evaporation, vacuum distillation, or simple decanting. The retrieved solid component then can be washed any number of times with a suitable diluent, especially one or more aliphatic or cycloaliphatic hydrocarbons, or a mixture thereof The resulting recovered catalyst composition can be dried using conventional techniques, such as passing an inert gas, especially nitrogen, over the solid to form a solid, granular powdery catalyst composition or it may be combined with an inert liquid, especially a hydrocarbon such as a mineral oil, for storage and use. The catalyst composition should be stored under an inert atmosphere and contact with water should be avoided.

When propylene is polymerized, the catalyst composition of the invention typically includes a selectivity control agent as previously mentioned. If not previously included in the catalyst composition, the SCA may also be incorporated with the monomers to be polymerized by separate addition to the reactor charge, if desired. The solid olefin polymerization catalyst may be used in slurry, liquid phase, gas phase, and liquid monomer-type polymerization systems as are known in the art for polymerizing olefins. Polymerization preferably is conducted in a fluidized bed polymerization reactor, by continuously contacting one or more olefins having 2 to 8 carbon atoms with the catalyst composition or with the separately added components. In accordance with the process, some or all of the catalyst components can be continually or semi-continually fed to the reactor in catalytically effective amounts together with the olefin monomer, and any additional reactor ingredients while the polymer product is continually removed during the continuous process. Fluidized bed reactors suitable for continuously polymerizing olefins have been previously described in U.S. Pat. Nos. 4,302,565, 4,302,566, 4,303,771, 4,543,399, 4,588,790 and elsewhere. Examples particularly include reactors utilizing a recycle stream of condensed reactor contents optionally including a low boiling inert condensing agent in what is known as condensing mode or super condensing mode. In addition, a fluidization aid such as carbon black, silica, clay, or talc may be used, as disclosed in U.S. Pat. No. 4,994,534.

Generally, olefin polymerization temperatures range from 0° C. to 200° C. at atmospheric, subatmospheric, or superatmospheric pressures. Slurry or solution polymerization processes may utilize subatmospheric or superatmospheric pressures and temperatures in the range of 40° C. to 110° C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, and toluene. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

Polymerization may be carried out in a single reactor or in two or more reactors in series, and is conducted substantially in the absence of catalyst poisons. Organometallic compounds may be employed as scavenging agents for poisons to increase the catalyst activity. Examples of scavenging agents are metal alkyls, preferably aluminum alkyls, most preferably triisobutylaluminum. A second catalyst composition, such as a metallocene compound whether supported on an inert support or not may also be employed simultaneously or sequentially with the present catalyst composition, if desired.

The precise procedures and conditions of the polymerization are broadly conventional but the olefin polymerization process, by virtue of the use therein of the polymerization catalyst formed from the solid precursor, provides polyolefin product having a relatively high bulk density in quantities that reflect the relatively high productivity of the olefin polymerization catalyst. In addition, the polymeric products produced in the present invention have a reduced level of fines.

Conventional additives may be included in the process, provided they do not interfere with the operation of the catalyst composition in forming the desired polyolefin. When hydrogen is used as a chain transfer agent in the process, it is used in amounts varying between 0.001 to 10 moles of hydrogen per mole of total monomer feed. Also, as desired for temperature control of the system, any gas inert to the catalyst composition and reactants can also be present in the gas stream.

The polymerization product of the present invention can be any product, homopolymer, copolymer, and terpolymer. Usually, the polymerization product is a homopolymer such as polyethylene or polypropylene, particularly polypropylene. Alternatively, the catalyst and process of the invention are useful in the production of copolymers including copolymers of ethylene and propylene such as EPR and polypropylene impact copolymers when two or more olefin monomers are supplied to the polymerization process.

It is understood that the present invention is operable in the absence of any component which has not been specifically disclosed. The following examples are provided in order to further illustrate the invention and are not to be construed as limiting. Unless stated to the contrary, all parts and percentages are expressed on a weight basis. The term "overnight", if used, refers to a time of approximately 16–18 hours, "room temperature", if used, refers to a temperature of 20–25° C., and "mixed alkanes" refers to a mixture of hydrogenated propylene oligomers, mostly $C_6$–$C_{12}$ isoalkanes, available commercially under the trademark Isopar E™ from Exxon Chemicals, Inc.

EXAMPLES

The following defined terms will be used in the examples.

Glossary

MMAO is tri(isobutyl)aluminum modified methyl aluminoxane containing approximately 30 percent isobutyl group substitution for methyl groups. (Type 3A, available from Akzo Corporation).

MMAO-12 is an alkyl aluminum modified methyl alumininoxane containing approximately 5 percent $C_{2-4}$ alkyl group substitution for methyl groups. (MMAO-12, available from Akzo Corporation).

MI is the melt index (optionally termed $I_2$), reported as grams per 10 minutes, determined in accordance with ASTM D-1238, condition E, at 190° C. and 2.1 Kg weight.

FI is the flow index (optionally termed $I_{21}$), reported as grams per 10 minutes, determined in accordance with ASTM D-1238 condition F, and was measured at ten times the weight used in the melt index test.

MFR is the melt flow ratio, determined as FI/MI.

Example 1

A) Precursor Preparation by Solid/Solid Metathesis 32.0 grams of $ZrCl_4$ (138 mmol), $Zr(OEt)_4$ (10.2 g, 37.5 mmol) and $Zr(OBu)_4$ (44.0 g, 87.5 toluene solution, 100 mmol) were mixed with 71 ml of ethanol (55.5 g, 1.2 mol) in a glass bottle. Methyl salicylate (1.9 g, 12.5 mmol) is then added and the mixture stirred overnight at room temperature to obtain a yellow to dark-brown solution. This solution is diluted with 660 g of chlorobenzene. The bottle is purged using nitrogen, capped tightly and placed in a hot bath at 75° and stirred at 440 rpm. When the internal temperature of the bottle reached 65° C., $Mg(OEt)_2$ (85.8 g, 750 mmol) was added. After 3 hours at 75° all of the magnesium ethoxide granules dissolved to produce a homogeneous translucent slurry. A gentle nitrogen flow is started and continued for 4 hours. Heating is then terminated and the reaction mixture allowed to stir while cooling to room temperature overnight.

The mixture is transferred to a glovebox under an inert atmosphere and filtered using a 600 ml medium frit and a 1 liter vacuum flask. The bottle was rinsed with 200 ml of chlorobenzene which was then used to wash the solids. The solids were then washed 3 times with 250 ml of hexane and dryed to produce 88.4 g of a dense white powder composed of translucent granules having average particle diameter of 12–24 µm. Analysis by scanning electron microscopy (SEM) revealed the granules to be in the form of aggregates of irregular shaped platelets. Analysis of the solid material revealed that it contained 13.9 percent Zr, and 13.5 percent Mg.

B) Procatalyst Formation

The foregoing magnesium and zirconium containing precursor (20.27 g) was slurried in 50 ml of toluene. The slurry was placed in a 75° oil bath to stir as 110 ml of 25 percent toluene solution of ethylaluminum dichloride (EADC) was added over about 4 minutes. The slurry slowly turned to a beige color. After stirring for 45 minutes, the mixture was filtered. The solids were washed twice with hexane and dried under moving nitrogen to yield 19.8 g of an off white powder. The powder was slurried again in 50 ml of toluene and returned to the 75° oil bath. Over a period of about three minutes, 110 ml of 25 percent EADC/toluene were added to produce a light gray slurry. After stirring for 45 minutes the mixture was filtered and the solids washed three times with hexane then dried under moving nitrogen. The yield was 16.4 g of grayish-white powder. Elemental analysis of the powder revealed that it contained approximately 9.3 percent Zr, 10.3 percent Mg, and 5.3 percent Al.

C) Catalyst Composition

The foregoing chlorination product (5.06 g ) was slurried into 13 ml of toluene and 22 ml of a 1.73 M heptane solution of MMAO were added (about 7.4 moles Al per mole Zr). The resulting purple slurry was stirred overnight at room temperature. The solids were collected by filtration, washed with 50/50 vol toluene/hexane and dried under moving nitrogen to give 4.38 g of a purple powder. A portion of the powder (2.13 g) was added to a solution of 0.65 g of 2-pyridyl-2-(N-(2,6-diisopropylphenyl)amino)propane in 23.5 g of toluene. After shaking for 4.5 days the resulting solid product was recovered by filtration, washed twice with 50/50 vol toluene/hexane and dried under moving nitrogen to give 2.38 g of brown-violet powder. A sample was prepared for polymerization testing by mixing 100 mg of the powder into 20 ml of mineral oil.

Example 2

A) The solid precursor A) from Example 1 was reused in this example.

B) Procatalyst Formation

The solid precursor of Example 1, step A (2.1 g) was slurred in 15 ml of hexane in a glass round bottom flask equipped with a stirrer at room temperature and 11 ml of a hexane solution comprised of 20 percent $SiCl_4$ and 5 percent $TiCl_4$ was added to the slurry over a period of 2 minutes. The initially off white slurry turned to tan. The reaction was then transferred to a 75° C. oil bath. After stirring for 45 minutes the slurry was filtered. The solids were washed once with a 50/50 (vol) toluene/hexane mixture then washed twice with hexane and dried under moving nitrogen to give about 2.0 g of the desired product as a solid tan powder.

C) Catalyst Composition

The solid precursor prepared above was shaken overnight with a 1.7 M heptane solution of MMAO (Al/Zr+Ti molar ratio=6/1). The solids were recovered by filtering and then stirred for 24 h with a toluene solution containing 0.8 equivalents of 2-pyridyl-2-(N-(2,6-diisopropylphenyl)amino)propane based on zirconium. The resulting solid product was recovered by filtration and dried to a free flowing powder. A sample was prepared for polymerization testing by mixing 100 mg of the powder into 20 ml of mineral oil.

Comparative Example A

The magnesium and zirconium containing precursor of Example 1B) (2.71 g) was slurried in 10 ml of toluene and 13.2 ml of 1.73 M MMAO/heptane was added (about 6.0 moles Al/mole Zr). The dark purple slurry was shaken overnight at room temperature. The solids were collected by filtration, washed once with toluene then twice with hexane and dried under moving nitrogen to give 3.62 g of purple powder. A sample was prepared for polymerization testing by mixing 200 mg of the powder into 20 ml of mineral oil.

Ethylene/1-Hexene Copolymerization

1) To a one liter stainless steel reactor containing 500 ml of hexane and 5 ml of 1-hexene, were added 38 standard cubic centimeters (SCC) of $H_2$ (6.2 kPa, 0.9 psi), and 0.5 ml of MMAO (1.09 mmol of 2.18 M heptane solution). The catalyst of Example 1 (0.5 ml of 0.6 percent slurry) was placed in a 50 $cm^3$ injection tank and then injected into the reactor using ethylene at a pressure of 1.2 MPa (170 psig) and about 20 ml of hexane. After polymerizing for 30 minutes at 65° C., while adding ethylene on demand to keep the total pressure at 1.2 MPa (170 psig), the reaction was extinguished by injecting 2 ml of isopropanol. The collected polymer was allowed to air dry overnight before characterization. The productivity was 34.1 Kg PE/g catalyst/690 kPa/hr. The polymer exhibited flow index ($I_{21}$) of 5.52 dg/min and MFR of 50. Analysis by SEC plotted as differential Mw distribution (DMwD) as a function of the log Mw revealed a symmetrical curve with Mw/Mn=6.27. The SEC of this polymer is shown in FIG. 1.

Figure 2:
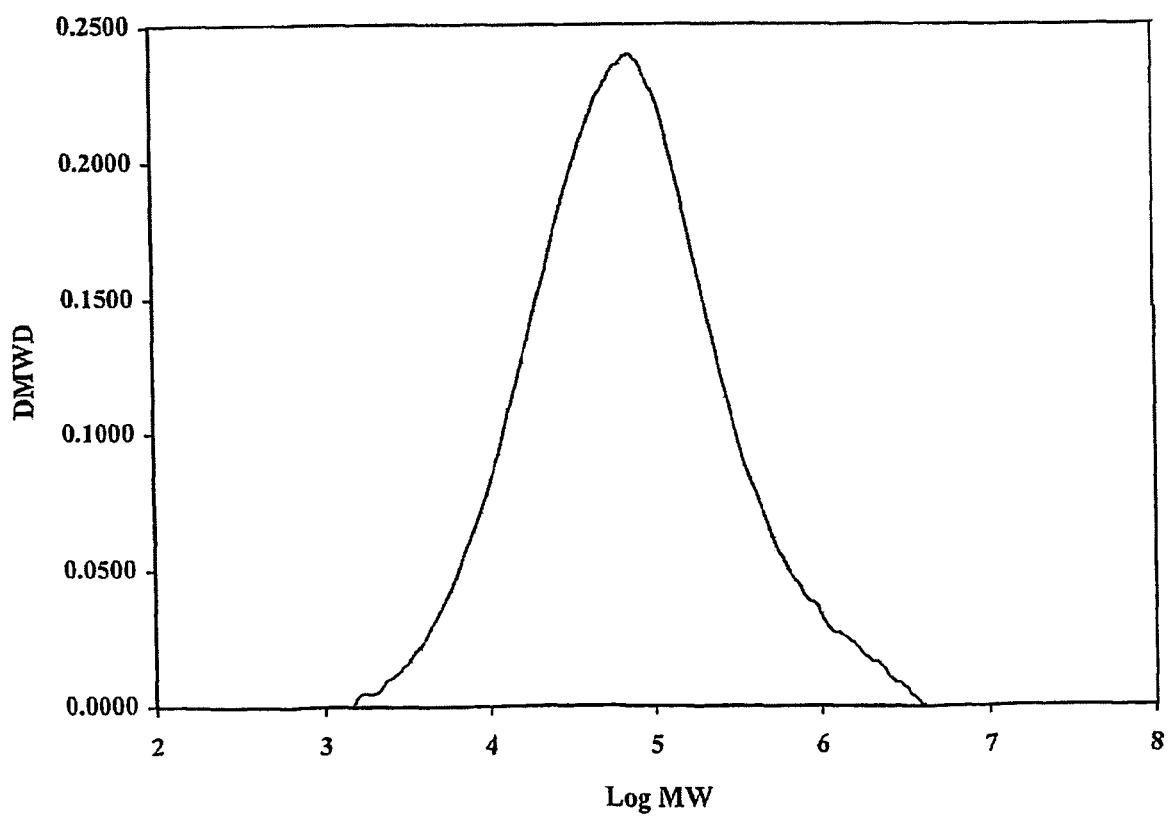
FIG. 2 is the size exclusion chromatograph (SEC) of the polymer obtained from polymerization example 2.

2) To a one liter stainless steel reactor containing 500 ml of hexane and 5 ml of 1-hexene, were added 158 standard cubic centimeters (SCC) of $H_2$ (46 kPa, 6.6 psi) and 0.5 ml of MMAO (1.09 mmol of 2.18 M heptane solution). The catalyst of Example 2 (0.5 ml of 0.6 percent slurry) was placed in a 50 $cm^3$ injection tank and then injected into the reactor using ethylene at a pressure of 1.2 MPa (170 psig) and about 20 ml of hexane. After polymerizing for 30 minutes at 65°, while adding ethylene on demand to keep the total pressure at 1.2 MPa (170 psig), the reaction was extinguished by injecting 2 ml of isopropanol. The collected polymer was allowed to air dry overnight before characterization. The productivity was 31.1 Kg PE/g catalyst/690 kPa/hr. The polymer exhibited FI of 8.53 dg/min and MFR of 145. SEC revealed an off symmetrical curve which exhibited a high molecular weight appendage with Mw/Mn=5.72. The SEC of this polymer is shown in FIG. 2.

Comparative A) To a one liter stainless steel reactor containing 500 ml of hexane and 10 ml of 1-hexene, were added 100 standard cubic centimeters (SCC) of $H_2$ (12 kPa, 1.7 psi), 0.1 ml of 0.86 M triisobutylaluminum in heptane and 1.0 ml of a 1.74 mmol heptane solution of MMAO. The catalyst composition of Comparative A), 0.5 ml of 1.2 percent mineral oil slurry) was placed in a 50 $cm^3$ injection tank and then injected into the reactor using ethylene at a pressure of 1.2 MPa (170 psig) and about 20 ml of hexane. After polymerizing for 30 minutes at 85° C. while adding ethylene on demand to keep the total pressure at 1.2 MPa (170 psig), the reaction was extinguished by injecting 2 ml of isopropanol. The collected polymer was allowed to air dry overnight before weighing. The productivity was 3.0 Kg PE/g catalyst/690 kPa/hr. (Representing less than 10 percent of the productivity of the corresponding catalyst of Example 1).

Example 3

A) Precursor Preparation by Solid/Solid Metathesis $HfCl_4$ (4.42 g, 13.8 mmol) and $Hf(OEt)_4$ (4.93 g, 13.8 mmol) were mixed with 10 g of chlorobenzene in an glass bottle, then 7.1 ml of ethanol (5.55 g, 120 mmol) was added. Methyl salicylate (0.38 g, 2.5 mmol) was added and the mixture stirred for a few minutes at 60° C. to yield a straw colored solution. The mixture was diluted with 66 g of chlorobenzene and placed in a heating oil bath. When the bath temperature reached 65° C., $Mg(OEt)_2$ (8.58 g, 75 mmol) was added. After stirring at 440 rpm for two hours at a temperature of 71–77° C., all of the $Mg(OEt)_2$ granules had dissolved and a translucent slurry had formed. A gentle stream of nitrogen was passed over the mixture until 10–15 percent of the solvent had evaporated. The solids were collected by filtration then washed once with chlorobenzene, twice with isooctane and dried under moving nitrogen. Obtained was 13.79 g of white powder which microscope examination showed to be composed primarily of granules having an average particle size of 25–35 μm.

B) Procatalyst Formation

The foregoing precursor from step A) (2.0 g) was slurried into 10 ml of toluene. Over about 4.5 minutes, 20 ml of 1.0 M ethylaluminum dichloride in hexane was added. The mixture was stirred for 50 minutes in a 75° C. oil bath. The solids were collected by filtration, washed twice with a 50/50 (vol) solution of hexane and toluene and taken nearly to dryness under moving nitrogen. The 1.57 g of white powder was reslurried in 10 ml of toluene then treated again with 20 ml of 1.0 M hexane solution of EADC for 25 minutes. The solids were collected by filtration then washed twice with 50/50 (vol) hexane/toluene, twice with hexane and dried under moving nitrogen. Yield was 1.37 g of white powder.

C) Catalyst Composition

The procatalyst powder from step B) was slurried in 12 ml of toluene then 5.0 ml of 2.0 M MMAO/heptane was added to give a slurry which turned from pink to purple over 2 hours. After stirring 14 hours at room temperature, the solids were collected by filtration, washed once with 50/50 (vol) toluene/hexane, twice with hexane then dried under moving nitrogen. Yield was 1.36 g of a violet colored powder. All of this powder was slurried into 10 ml toluene in a glass round bottom flask and a solution of 0.63 g of (6-(1-naphthyl)pyrid-2-yl)(N-(2,6-diisopropylphenyl)amino)(2-methylphenyl)methane in 10 ml of toluene was added. After stirring the mixture overnight at about 48° C., the solids were collected by filtration, washed twice with toluene, twice with hexane then dried under moving nitrogen The yield was 1.615 g of gray colored powder.

Example 4

A) Precursor Preparation

HfCl$_4$ (4.42 g, 13.8 mmol), Hf(OEt)$_4$ (1.35 g, 3.75 mmol) and Zr(OBu)$_4$ (4.40 g, 87.5 percent, 10 mmol) were slurried in 10 g of chlorobenzene in a glass bottle, then 7.1 ml of ethanol (5.55 g, 120 mmol) was added. The mixture was stirred 10 minutes at 60° C. to give a clear solution then methyl salicylate (190 mg, 1.25 mmol) was added. The solution was diluted with 66 g of chlorobenzene then stirred at 440 rpm in a heating oil bath. When the bath temperature reached 65° C., Mg(OEt)$_2$ (8.58 g, 75 mmol) was added. After the mixture had stirred for 2 hours at 76 to 78° C., all of the Mg(OEt)$_2$ granules had dissolved and a translucent slurry had formed. A gentle stream of nitrogen was flowed over the mixture until 10–15 percent of the solvent had evaporated. The solids were collected by filtration then washed once with chlorobenzene, twice with isooctane and dried under moving nitrogen. Obtained were 12.3 g of white powder which microscope examination showed to be composed of glassy particles having an average particle size of 12–25 μm.

B) Procatalyst Formation 2.0 g of the foregoing precursor was slurried into 10 ml of toluene. Over about 2 minutes, 20 ml of 1.0 M ethylaluminum dichloride in hexane was added. The mixture was stirred for 30 minutes in a 77° C. oil bath. The solids were collected by filtration, washed twice with a 50/50 (vol) solution of hexane and toluene and taken nearly to dryness under moving nitrogen. The product, 1.82 g, was reslurried in 10 ml of toluene then treated again with 20 ml of 1.0 M hexane solution of EADC for 25 minutes. The solids were collected by filtration then washed twice with 50/50 (vol) hexane/toluene, twice with hexane and dried under moving nitrogen. Yield was 1.37 g of white powder.

C) Catalyst Composition

The foregoing procatalyst was slurried in 12 ml of toluene then 5.0 ml of 2.0 M MMAO/heptane was added to give a purple slurry. After stirring overnight at room temperature the solids were collected by filtration, washed once with 50/50 (vol) toluene/hexane, twice with hexane then dried under moving nitrogen. Yield was 1.42 g of purple powder. A portion of this material, 1.07 g, was slurried into 7.5 ml toluene and a solution of 0.47 g of (6-(1-naphthyl)pyrid-2-yl)(N-(2,6-diisopropylphenyl)amino)(2-methylphenyl)methane in 7.5 ml of toluene was added. After stirring the mixture for a week at room temperature, the solids were collected by filtration, washed twice with toluene, twice with hexane then dried under moving nitrogen. The yield was 1.68 g of gray powder.

Slurry Propylene Polymerization

A one gallon autoclave equipped with a 6.35 cm paddle stirrer and a two slat baffle was charged with 2.7 L of propylene then heated to 60° C. whereupon 3.5 ml of 1.0 M heptane solution of triisobutylaluminum, 5.0 ml of 12.3 percent toluene solution of MMAO-12 were added. After 20 minutes, 0.25 g of the desired catalyst composition was injected into the reactor using isooctane as carrier. The reactor temperature was then raised to 67° C. After stirring for the indicated time the reaction was terminated by venting the propylene and rapidly cooling the mixture. Results and polymer properties are contained in Table 1.

TABLE 1

| Run | Catalyst | Time (hr) | Yield (g) | mmmm (percent) | mmmr (percent) | rrrr (percent) | regio defects (2,1-additions) |
|---|---|---|---|---|---|---|---|
| 1 | Ex. 3 | 1 | 14 | 85.2 | 5.6 | 0.4 | 1.3 percent |
| 2 | Ex. 4 | 3 | 19 | 85.9 | 5.6 | 0.4 | 1.1 percent |

What is claimed is:

1. A solid, hydrocarbon insoluble catalyst composition comprising:

A) a solid, particulated complex comprising moieties of at least magnesium, a Group 4 transition metal, and a halide;

B) one or more α-amino-substituted- or α-imino- substituted-2-alkylpyridine compounds corresponding to the formula:

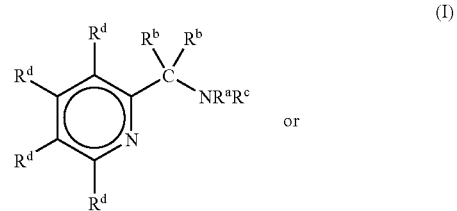

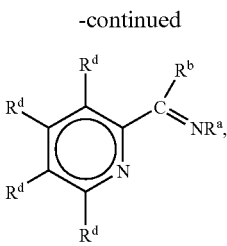

(II)

wherein:
- $R^a$ is aryl, or an aryl group substituted with one or more alkyl, halo, haloalkyl, or dihydrocarbylamine groups, said $R^a$ group having from 6 to 30 carbons;
- $R^b$ and $R^d$, independently each occurrence, are selected from the group consisting of hydrogen, $R^a$, $C_{1-10}$ alkyl, $C_{1-10}$ haloalkyl, and $C_{7-20}$ aralkyl with the proviso that at least one of $R^d$ is a bulky, polycyclic aromatic group; and
- $R^c$ is hydride, an alkali metal cation, an alkaline earth metal halide cation, or a cationic organometal ligand comprising a metal of Groups 2–13 of the Periodic Table of the Elements;

C) one or more organoaluminum cocatalyst compounds;
D) optionally one or more internal electron donors; and
E) optionally one or more selectivity control agents.

2. The catalyst composition as claimed in claim 1, wherein the Group 4 metal is Zr, Hf or a mixture of Zr and Hf.

3. The catalyst composition as claimed in claim 1, wherein $R^d$ at the 6-position on the pyridine is 1-naphthyl.

4. The catalyst composition as claimed in claim 3, wherein the substituted 2-alkylpyridine compound is (6-(1-naphthyl)pyrid-2-yl)(N-(2,6-diisopropylphenyl)amino)(2-methylphenyl)methane.

5. The catalyst composition as claimed in claim 1, wherein the solid, particulated magnesium and Group 4 metal halide complex corresponds to the formula $Mg_dTi(OR^e)_eX_f(ED)_g$ wherein $R^e$, independently each occurrence is an aliphatic or aromatic hydrocarbon radical having 1 to 14 carbon atoms or $COR^f$ wherein $R^f$ is an aliphatic or aromatic hydrocarbon radical having 1 to 14 carbon atoms; X independently each occurrence is chlorine, bromine or iodine; ED is an electron donor; d is a number from 1 to 50; e is a number from 0 to 5; f is a number from 2 to 100; and g is a number from 0 to 10.

6. A method of making a catalyst component as claimed in claim 1 comprising contacting components A), B) and C) and optionally components D) and E) in an inert diluent in any order, with or without intermediate recover of a product, and removing the diluent.

7. A process of polymerizing at least one olefin comprising contacting at least one olefin in the presence of the catalyst composition of claim 1.

8. The process of claim 7 wherein propylene is homopolymerized or copolymerized with one or more olefins or diolefins.

* * * * *